US009709022B2

(12) United States Patent
Friedenthal

(10) Patent No.: US 9,709,022 B2
(45) Date of Patent: Jul. 18, 2017

(54) APPARATUS FOR GENERATING ENERGY

(71) Applicant: Reginald Friedenthal, Randburg (ZA)

(72) Inventor: Reginald Friedenthal, Randburg (ZA)

( * ) Notice: Subject to any disclaimer, the term of this patent is extended or adjusted under 35 U.S.C. 154(b) by 197 days.

(21) Appl. No.: 14/398,864

(22) PCT Filed: May 3, 2013

(86) PCT No.: PCT/ZA2013/000031
§ 371 (c)(1),
(2) Date: Nov. 4, 2014

(87) PCT Pub. No.: WO2013/166529
PCT Pub. Date: Nov. 7, 2013

(65) Prior Publication Data
US 2015/0121878 A1    May 7, 2015

(30) Foreign Application Priority Data

May 4, 2012 (ZA) .................................. 2010/03373

(51) Int. Cl.
*F01B 21/04*    (2006.01)
*F03B 13/24*    (2006.01)
*F03B 13/14*    (2006.01)

(52) U.S. Cl.
CPC ............ *F03B 13/24* (2013.01); *F03B 13/142* (2013.01); *F03B 13/148* (2013.01); *F05B 2210/404* (2013.01); *F05B 2240/12* (2013.01); *F05B 2240/13* (2013.01); *Y02E 10/32* (2013.01); *Y02E 10/38* (2013.01)

(58) Field of Classification Search
CPC ...... F03B 13/142; F03B 13/148; F03B 13/24; F05B 2210/404; F05B 2240/12; F05B 2240/13; Y02E 10/32; Y02E 10/38
See application file for complete search history.

(56) References Cited

U.S. PATENT DOCUMENTS

| 1,611,341 | A | * | 12/1926 | Deriaz | ...................... F03B 3/00 415/129 |
| 3,925,986 | A | | 12/1975 | Barwick | |
| 4,264,279 | A | * | 4/1981 | Dereng | ................... F03D 3/061 416/197 A |
| 4,271,668 | A | | 6/1981 | McCormick | |
| 4,286,347 | A | | 9/1981 | Modisette | |
| 4,383,413 | A | * | 5/1983 | Wells | ..................... F03B 13/142 60/398 |
| 4,533,292 | A | * | 8/1985 | Sugihara | ............... F03B 13/142 415/211.1 |
| 5,575,587 | A | | 11/1996 | Chen | |
| 9,371,815 | B2 | * | 6/2016 | Franco de Oliveira Falcao | ...................... F03B 3/12 |
| 2011/0101696 | A1 | | 5/2011 | Holle et al. | |
| 2012/0038163 | A1 | | 2/2012 | Hanna | |

FOREIGN PATENT DOCUMENTS

GB       2 175 962 A       12/1986

OTHER PUBLICATIONS

International Search Report, dated Oct. 18, 2013, from corresponding PCT application.

* cited by examiner

*Primary Examiner* — Jesse Bogue
(74) *Attorney, Agent, or Firm* — Young & Thompson

(57) ABSTRACT

Apparatus for generating energy in which an oscillating air column created by wave motion continuously drives a turbine in one direction.

10 Claims, 2 Drawing Sheets

APPARATUS FOR GENERATING ENERGY

BACKGROUND OF THE INVENTION

This invention relates to the generation of energy from a moving fluid.

A number of systems have been proposed for extracting energy from waves. Reference is made in this respect to US2011/0101696; US2012/0038163 and U.S. Pat. No. 4,271,668. The last-mentioned case discloses a counter-rotating turbine which converts energy from an alternating air flow above a water surface into mechanical energy. In US2012/0038163 use is made of a dual rotor turbine configuration responsive to bidirectional air flow. US2011/0101696 makes use of an air turbine which rotates in one direction for an incident air flow received from opposite directions.

Oscillating water column devices for converting wave energy into usable electrical or mechanical energy are normally on shore, near shore or off shore, units which are rigidly erected on the ocean floor or which are tethered in a rigid manner to the ocean floor. During storm conditions these devices are vulnerable to damage and destruction.

The present invention is concerned with apparatus of simplified construction which can generate energy from fluid which flows alternately in opposite directions, and which has an enhanced capability to withstand the effects of stormy conditions.

SUMMARY OF THE INVENTION

The invention provides apparatus for generating energy which includes a housing, a passage which extends through the housing, which has a first end and a second end and which forms a path for fluid flow between the first end and the second end, and a turbine which is mounted at a location inside the passage for rotation about an axis which, at the location, is generally transverse to the fluid flow path, and wherein the passage is shaped to direct fluid flow, when the fluid is flowing from the first end towards the second end, onto the turbine thereby to cause the turbine to rotate about the axis in an operational direction and to direct fluid flow, when the fluid is flowing from the second end towards the first end, onto the turbine thereby to cause the turbine to rotate in the operational direction.

The turbine may include a plurality of vanes with respective outer edge sections and the passage may be shaped to direct fluid flow from either side of the turbine primarily onto the outer edge sections.

The passage is preferably shaped, by means of at least a first deflecting formation between the turbine and the first end, to direct fluid flow primarily onto a first region of the turbine which is displaced from the axis and is further shaped, by means of at least a second deflecting formation between the turbine and the second end, to direct fluid flow primarily onto a second region of the turbine which is displaced from the axis and wherein the second region is generally diametrically opposed to the first region.

The first end may be higher than the second end. The first end may be open to atmosphere.

The fluid is preferably air.

The apparatus may include a vessel which defines a chamber, a port at a lower end of the vessel which allows water to enter and then leave the chamber, a connection at an upper end of the vessel to the housing whereby the second end of the passage is placed in fluid flow communication with the chamber, and a mechanism for anchoring the vessel at a desired position.

The apparatus may include at least one buoyancy member fixed to the vessel.

The vessel preferably comprises a cylinder which is generally vertically orientated with a closure connected to an upper end of the cylinder. The port may be constituted by an open lower end of the cylinder. The anchor mechanism may comprise one or a plurality of flexible lines which are fixed to the cylinder and to one or more anchors. The buoyancy member may be fixed to an outer side of the cylinder. The housing may be connected to the vessel on the closure.

The turbine may be connected directly or indirectly to an electrical generator.

BRIEF DESCRIPTION OF THE DRAWINGS

The invention is further described by way of example with reference to the accompanying drawings in which.

DESCRIPTION OF PREFERRED EMBODIMENTS

Figure 1:
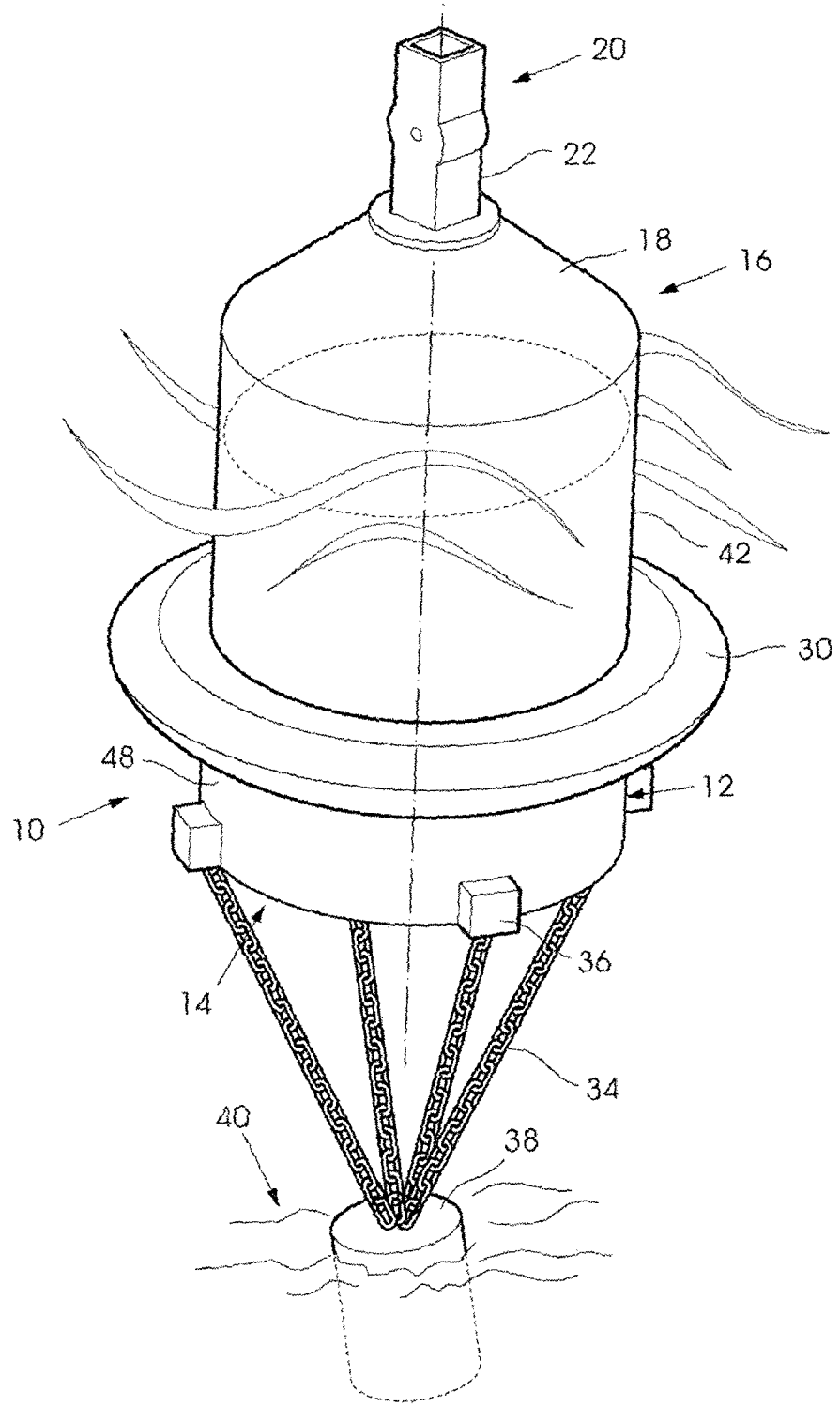
FIG. 1 illustrates in perspective apparatus for generating energy according to one form of the invention.

FIG. 1 of the accompanying drawings illustrates in perspective apparatus 10 according to one form of the invention. The apparatus includes a vessel 12 of circular cylindrical form, with a lower end 14 and an upper end 16. The lower end is open and faces downwardly. The upper end has fixed to it a conical closure 18. A housing 20 is fixed to an opening 22 at an apex of the conical closure.

A buoyancy ring 30 is secured to an outer surface of the vessel 12.

A plurality of tethering chains or ropes or cables 34 are fixed to reinforced mounting locations 36 at peripheral positions at the lower end 14 of the vessel. The tethering cables extend to a robust and substantial anchor 38 formed by a large mass. The anchor rests on an ocean bed 40.

The water above the bed has what may be referred to as a still water level 42 which is above the buoyancy member 30. Under calm conditions a longitudinal axis 48, which extends through the apparatus, is generally vertical. A section of the apparatus is in the air above the still water level.

Figure 2:
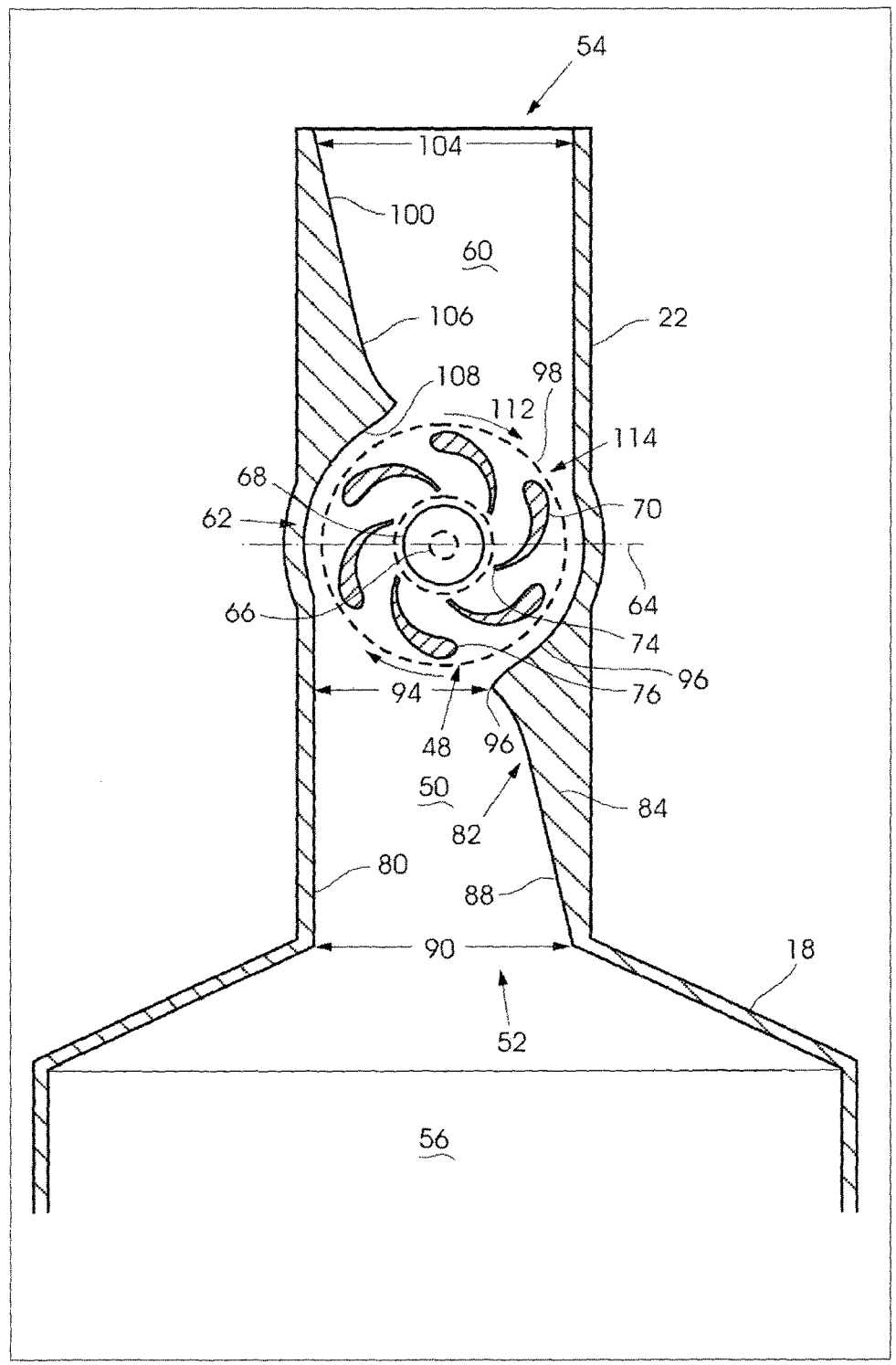
FIG. 2 illustrates on an enlarged scale and in cross-section from one side, an upper portion of the apparatus of FIG. 1.

FIG. 2 illustrates from one side and in cross-section, on a substantially enlarged scale, a part of the conical closure 18 and the housing 20. A passage 50 extends through the housing. The passage has a first end 52 which is lowermost and a second end 54 which is uppermost and which is open to atmosphere. The passage forms an air flow path 60 which is indicated by means of a dotted line between the first end and the second end.

A turbine 62 is mounted at a location 64 inside the passage 50. The turbine has a central axis 66 which extends transversely to the path 60, at least at the location 64. The turbine has fixed to it, an electrical generator 68 which is notionally shown only. This generator may take on any suitable form known in the art and for this reason is not further described. The turbine includes a plurality of vanes 70 which extend radially from the axis 66. Each vein is curved in a manner which is determined by taking into account fluid flow dynamics and has a thin leading edge 74 and a rounded thickened trailing edge 76. From FIG. 2 it is apparent that the turbine in cross-section has a circular profile. In a direction which is parallel to the axis 66 the turbine is elongate. The axis 66 and the vanes 70, extend laterally inside the passage substantially between opposing walls of the housing 20.

The housing has an inner wall 80 which is shaped, in two dimensions along the depth of the housing. A first inner surface 82 forms a first deflecting formation 84, between the turbine and the first end 52 which extends inwardly in a gradual arc 88 so that the width 90 of the passage gradually decreases to a minimum dimension 94 adjacent the turbine. At this point a curved surface 96 of substantially circular shape is close to an outer rotational path 98 of the turbine.

A second deflecting formation 100 is formed between the second end 54 and the turbine. This deflecting formation is substantially in the form of a mirror image of the deflecting formation 84. Thus, moving away from the second end 54 towards the turbine, the width 104 of the passage 50 decreases gradually along the length of a curved surface 106 of the deflecting formation. The surface 106 terminates close to the outer rotational path 98 of the turbine and is then linked to a curved surface section 108 of the wall 84 which is closely spaced from the path 98, which bounds the path 98.

The apparatus 10 is anchored at a suitable location on the ocean floor as shown in FIG. 1. The tethering devices 34 have lengths which allow the still water level 42 to be well above the buoyancy member 30. As noted the lower end 14 of the vessel 14 is open and, under calm conditions, the water in the vessel is more or less at the level 42. Air occupies the interior of the vessel, the conical section 18 and the housing 20, above the water level 42.

With wave action the level 42 oscillates up and down inside the vessel 12. As the water level rises a column of air is expelled upwardly from the vessel and moves through the housing. As the water level drops the air flows through the housing 20 into the vessel 12. Thus an interior of the housing is subjected to air flow which moves upwardly and downwardly, i.e. in opposite directions through the passage 50.

When the air moves upwardly the air flow is deflected by the formation 88 to the left of the passage 50 (referring to FIG. 2). As the cross-sectional area of the passage is reduced, moving towards the turbine, the air flow is accelerated and diverted to the left of the turbine i.e. the air flow impinges at a higher velocity on the outer edge sections of the vanes in a region 110. Rotational movement is thus imparted to the turbine in a clockwise direction 112, referred to as an operational rotational direction. The air passes with and around the turbine and then moves upwardly, above the turbine, to atmosphere through the open upper end 54. As the water level in the vessel drops air flows in the reverse direction through the passage. Air enters at the second end 54 and is deflected by the formation 100 to the right, relative to the turbine and, in a similar manner to what has been described, the air velocity is increased due to the reducing cross-section of the passage as the air approaches the turbine. The air flow is thus directed primarily to the outer edge sections 114 of the vanes in a region 116 which is more or less diametrically opposed to the region 110. Thus, the turbine is subjected to air flow which causes the turbine to continue rotating in the operational direction 112.

The arrangement of the housing is thus one in which, irrespective of the direction of air flow through the housing, the turbine is forced to move by the air flow continuously in one direction.

In stormy conditions the oscillating water column contained inside the vessel 12 is moved to some extent laterally although it is restrained in a vertical direction. The flotation device 30 continuously urges the apparatus upwardly while the anchor 38 tethers the apparatus to the ocean bed. Thus, to a substantial extent, maximum use is continuously made of the oscillation of the water which is due to wave movement.

As used herein "wave" means any movement of water due to a swell which causes the water level to vary relative to the ocean bed, and, in particular, includes a wave swell.

The vanes are shaped so that negative pressure on the leading sides of the vanes provide rotational movement in the direction 112 as the accelerated air passes upwardly through the housing, and enters the atmosphere. Similarly, as a wave recedes, negative pressure within the upper region of the chamber draws air back through the passage where it is accelerated and deflected by the formation 106 onto the outer edges of the vanes. The negative pressure on the leading sides of the vanes continues to provide rotational movement in the direction 112 as the accelerated air passes and enters the upper region of the chamber.

The invention claimed is:

1. Apparatus for generating energy comprising:
   a housing,
   a passage which extends through the housing, the passage having a first end and a second end and forming a path for fluid flow between the first end and the second end, and
   a turbine which is mounted at a location inside the passage for rotation about an axis which, at the location, is transverse to the fluid flow path,
   wherein the passage is shaped to direct fluid flow, when the fluid is flowing from the first end towards the second end, onto the turbine thereby to cause the turbine to rotate about the axis in an operational direction, and to direct fluid flow, when the fluid is flowing from the second end towards the first end, onto the turbine thereby to cause the turbine to rotate in the operational direction,
   wherein the turbine includes a plurality of vanes, each of the plural vanes having a leading edge adjacent the axis, a trailing outer edge which is radially outwardly displaced from the leading edge, and a curved leading side which extends between the leading edge and the trailing edge, the trailing edge being rounded and being thicker than the leading edge, and
   wherein the housing includes a first deflecting formation between the turbine and the first end, and a second deflecting formation between the turbine and the second end, and each deflecting formation is configured to direct fluid flow, at an increased velocity, onto the trailing outer edges of the vanes to create a negative pressure on the curved leading sides of the vanes, which causes rotational movement of the turbine in the operational direction.

2. Apparatus according to claim 1 wherein the first end is higher than the second end.

3. Apparatus according to claim 1 wherein the first end is open to atmosphere.

4. Apparatus according to claim 1 wherein the fluid is air.

5. Apparatus according to claim 1 further comprising a vessel which defines a chamber, a port at a lower end of the vessel which allows water to enter and then leave the chamber, a connection at an upper end of the vessel to the housing, wherein the second end of the passage is placed in fluid communication with the chamber and a mechanism for anchoring the vessel at a desired position in water.

6. Apparatus according to claim 5 wherein the vessel comprises a cylinder which is vertically orientated with a closure connected to an upper end of the cylinder, wherein the port is constituted by an open lower end of the cylinder, and wherein the anchor mechanism comprises a plurality of spaced apart flexible tethering lines fixed to the cylinder and to an anchor.

7. Apparatus according to claim 5 further comprising at least one buoyancy member fixed to the vessel.

8. Apparatus according to claim 6 further comprising an electrical generator which is connected to the turbine and which is rotatable upon orientation of the turbine.

9. Apparatus according to claim 7 wherein the buoyancy member is fixed to an outer side of the cylinder and is positioned so that it is immersed in water when the vessel is anchored.

10. Apparatus according to claim 6 further comprising at least one buoyancy member fixed to the vessel.

* * * * *